(12) United States Patent
Koch et al.

(10) Patent No.: US 9,902,786 B2
(45) Date of Patent: Feb. 27, 2018

(54) METHOD FOR IMMEDIATELY TERMINATING RADICAL POLYMERIZATIONS, INHIBITOR SOLUTION, AND USE THEREOF

(71) Applicant: Allessa GmbH, Frankfurt (DE)

(72) Inventors: Peter Koch, Frankfurt (DE); Manfred Krattenmacher, Karben (DE)

(73) Assignee: ALLESSA GMBH, Frankfurt (DE)

( * ) Notice: Subject to any disclaimer, the term of this patent is extended or adjusted under 35 U.S.C. 154(b) by 103 days.

(21) Appl. No.: 14/758,648

(22) PCT Filed: Dec. 4, 2013

(86) PCT No.: PCT/EP2013/003666
§ 371 (c)(1),
(2) Date: Jun. 30, 2015

(87) PCT Pub. No.: WO2014/106518
PCT Pub. Date: Jul. 10, 2014

(65) Prior Publication Data
US 2015/0337056 A1   Nov. 26, 2015

(30) Foreign Application Priority Data
Jan. 5, 2013 (DE) .................. 10 2013 000 128

(51) Int. Cl.
*C08F 2/42* (2006.01)
*C08F 2/02* (2006.01)
(Continued)

(52) U.S. Cl.
CPC ............... *C08F 2/42* (2013.01); *C08F 22/02* (2013.01); *C08F 22/10* (2013.01)

(58) Field of Classification Search
CPC ............. C08F 2/42; C08F 22/10; C08F 22/02
See application file for complete search history.

(56) References Cited

U.S. PATENT DOCUMENTS

2008/0098928 A1*  5/2008  Oyanagi ................ B41J 11/002
106/31.13

FOREIGN PATENT DOCUMENTS

| EP | 1229005 A2 | 8/2002 |
| EP | 1683652 A1 | 7/2006 |

(Continued)

OTHER PUBLICATIONS

International Search Report dated Apr. 1, 2014.
International Preliminary Report on Patentability dated Jul. 9, 2015.

*Primary Examiner* — Catherine S Branch
(74) *Attorney, Agent, or Firm* — Michael W. Ferrell; Ferrells, PLLC; Anna L. Kinney

(57) ABSTRACT

A method is described for immediately terminating free radical polymerizations by adding an inhibitor solution comprising a phenothiazine compound and/or a monoalkyl ether of hydroquinone to the free radical polymerizing system. The method is characterized in that the solvent of the inhibitor solution comprises at least 50% by weight of the solvent of alkylene glycol and/or polyalkylene glycol and/or terminally etherified derivatives of alkylene glycol and/or of polyalkylene glycol. The method permits the use of nontoxic inhibitor solutions.
Inhibitor solutions are also described which comprise a phenothiazine compound and/or a monoalkyl ether of hydroquinone and, as solvent, alkylene glycol and/or polyalkylene glycol and/or terminally etherified derivatives of these compounds.

21 Claims, 3 Drawing Sheets

(51) Int. Cl.
*C08F 2/10* (2006.01)
*C08F 22/10* (2006.01)
*C08F 22/02* (2006.01)

(56) References Cited

FOREIGN PATENT DOCUMENTS

EP           1918108 A1    5/2008
WO    WO2002050160 A2    6/2002

* cited by examiner

METHOD FOR IMMEDIATELY TERMINATING RADICAL POLYMERIZATIONS, INHIBITOR SOLUTION, AND USE THEREOF

CLAIM FOR PRIORITY

This application is a national phase application of PCT/EP2013/003666 FILED Dec. 4, 2013 which was based on application DE 10 2013 000 128.5 FILED Jan. 5, 2013. The priorities of PCT/EP2013/003666 and DE 10 2013 000 128.5 are hereby claimed and their disclosures incorporated herein by reference.

TECHNICAL FIELD

The present invention relates to solutions and a method for immediately terminating free radical polymerizations.

BACKGROUND

Since free radical polymerizations, once initiated—whether intentionally or unintentionally—are strongly exothermic, the polymerization may accelerate, on inadequate removal of the heat of reaction, by self-induced heating of the reaction mass such that it gets out of control and critical conditions—including up to explosion of the reaction vessel—occur.

If the abovementioned heat removal takes place in an inadequate manner in free radical polymerizations, there is a danger that the polymerization will be so vigorous that the vessel containing the polymerization mixture will explode if the runaway polymerization (for example, free radical mass, solution, emulsion or suspension polymerization of compounds (monomers) having at least one ethylenically unsaturated group) is not counteracted.

However, such an effective countermeasure is also required, in particular in the case of unintentionally initiated free radical polymerizations. Unintentionally initiated free radical polymerizations may occur, for example, during the storage and/or transport of substances containing monomers, since both heat and light or undesired free radicals can initiate the free radical polymerization of monomers. It is true that an attempt is usually made to prevent such unintentional free radical polymerizations by adding small amounts (as a rule up to 1000 ppm by weight) of free radical polymerization inhibitors (free radical acceptors, polymerization inhibitors) to the monomers. However, their inhibiting effect must not be too pronounced since otherwise they would have to be separated off before subsequent use of the monomers for free radical polymerization purposes. However, free radical polymerization initiators can usually predominate over a moderately inhibiting effect, as possessed, for example, by the monomethyl ether of hydroquinone (MEHQ), and it is for this reason that MEHQ is a storage and/or transport stabilizer particularly frequently used for monomers. However, experience has shown that, even in the case of monomers stabilized with storage and/or transport stabilizers, an unintentional free radical polymerization of said monomers cannot be completely ruled out. The latter applies in particular when the monomers are (meth)acrylic monomers and/or styrene, which particularly readily undergo free radical polymerization.

The term (meth)acrylic monomers is understood here to mean substances which comprise acrylic acid or methacrylic acid or derivatives thereof, for example, acrolein, methacrolein, acrylic acid, methacrylic acid and/or esters of the two acids just mentioned. In this description, (meth)acrylic is generally used as an abbreviation for acrylic and/or methacrylic.

Especially substances which comprise at least 90% by weight of (meth)acrylic monomers and/or styrene are at risk with regard to an unintentional free radical polymerization (this also applies when polymerization inhibitors are added as a preventive measure). This applies in particular when such substances are exposed to extreme external conditions during transport and/or during storage (for example, extremely high temperatures during the transport by ship through the various climatic zones (e.g. across the equator), as is the case, for example, for transport from Europe to Southeast Asia, or extremely low temperatures, as in the case of storage in outdoor tanks in northern countries. In particular, low temperatures are not without risks since they can in extreme cases lead to a partial or complete crystallization of the monomers. The latter usually results in separation of monomers and stabilizer (purification by crystallization), which may lead to the presence of unstabilized regions of monomers and subsequent melting for a certain duration, which regions can with high probability be the starting point of an unintentional free radical polymerization.

For safe transport and/or safe storage of monomer-containing substances, there is therefore a need for a process which is capable of very rapidly terminating an unintentionally initiated free radical polymerization of the monomers. Such a process is also required, however, for stopping runaway unintentional free radical polymerizations immediately.

An effective countermeasure to such a free radical polymerization becoming uncontrollable has already been described in the literature (see, for example, Process Safety Progress 1993 (Vol. 12 No. 2), pp. 111-114, WO 99/21893 A2 and DE 199 18 970 A1).

Solutions of known inhibitors of free radical polymerization [e.g. phenothiazine or hydroquinone monomethyl ether (MEHQ)] are used for this purpose.

Whereas in the journal article in Process Safety Progress no reference is made to possible solvents, the two patent documents mentioned above describe the use of N-methylpyrrolidone and/or N-ethylpyrrolidone.

The N-alkylpyrrolidones mentioned are good solvents for phenothiazine and/or MEHQ and solutions thereof are stable at low temperatures down to −11° C. Moreover, their water-miscibility is seen as an advantage since they are also applicable to aqueous-based systems in this form.

However, alkylpyrrolidones are subject to labelling due to their teratogenic effect and toxicity if swallowed. There is, therefore, considerable interest in alternative formulations of the inhibitors with (water-miscible) organic solvents which are toxicologically harmless and ideally not subject to labelling. The literature cited above gives no indication of such solvents.

It has been found in some experiments that phenothiazine is only poorly soluble in conventional organic solvents (e.g. the solubility in methanol, ethanol, isopropanol, toluene, cyclohexane or n-hexane is less than 2-3 percent by weight). Only in the N-methylpyrrolidone already mentioned and in the chemically and toxicologically related dimethylformamide could concentrated solutions of 30 percent by weight or more be prepared.

Tetrahydrofuran and acetone could also be identified as good solvents. Unfortunately these solvents have low boiling points and flashpoints which render transport, storage and handling of the solutions more difficult.

The object of the present invention, therefore, was to provide a method for immediately terminating free radical polymerizations in the most advantageous and most broadly applicable manner.

SUMMARY OF INVENTION

Accordingly, a method has been found for immediately terminating free radical polymerizations by adding an inhibitor solution comprising a phenothiazine compound and/or a monoalkyl ether of hydroquinone to the free radical polymerizing system, which is characterized in that the solvent of the inhibitor solution comprises at least 50% by weight of alkylene glycol and/or polyalkylene glycol and/or terminally etherified derivatives of alkylene glycol and/or of polyalkylene glycol.

It has been found, surprisingly, that the inhibitors phenothiazine and hydroquinone monoalkyl ether, particularly phenothiazine and/or MEHQ, are readily soluble in poly(alkylene) glycol(s) and form stable solutions at temperatures down to −25° C., for example. Particularly surprising here is the fact that the solubility of phenothiazine in (poly)alkylene glycols in the range between −20° C. and +20° C. is virtually independent of the temperature, such that no formation of solid in the solutions is to be feared from temperature fluctuations (see FIG. 1).

BRIEF DESCRIPTION OF DRAWINGS

The invention is described in detail below with reference to the drawings, in which.

DETAILED DESCRIPTION

Figure 1:
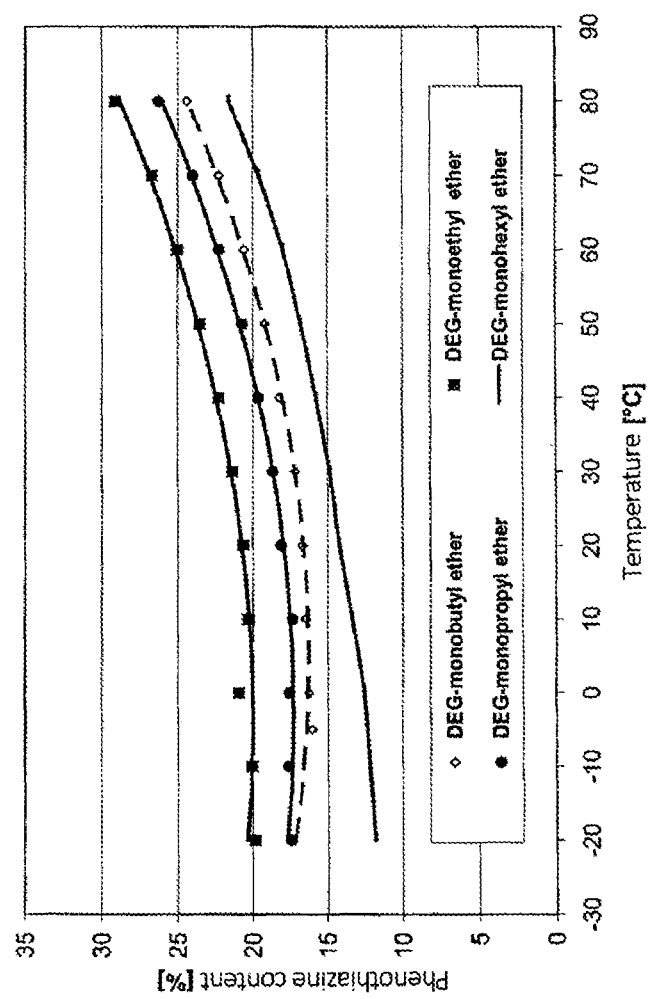
FIG. 1 is a graph illustrating the solubility of phenothiazine in selected diethylene glycol ethers from the group of (poly)alkylene glycols.

The inhibitors used according to the invention are, for example, unsubstituted phenothiazine and also unsubstituted phenothiazine-5-oxide or a hydrohalide of said compounds. The 5-position in the phenothiazine system is the position of the ring sulfur atom. These compounds are referred to in this description as phenothiazine compounds.

In addition to the unsubstituted phenothiazine, the 5-oxide thereof or hydrohalide thereof, substituted derivatives of these compounds may also be used. Each position in the ring, where a substitution is possible, may be substituted and one or more substituents can be present.

Typical substituents are alkyl groups, alkoxy groups, aryl groups, aroyl groups, carboxyl groups, carboxylic ester groups, carboxamide groups, halogen atoms, hydroxyl groups, nitro groups or a combination of two or more of these groups.

Preferred phenothiazine compounds are selected from the group of phenothiazine, the alkyl-substituted phenothiazines, the aryl-substituted phenothiazines, the aroyl-substituted phenothiazines, the carboxyl-substituted phenothiazines, the halogen-substituted phenothiazines, the N-(dialkylaminoalkyl)-substituted phenothiazines, phenothiazine-5-oxide, the alkyl-substituted phenothiazine-5-oxides, the aryl-substituted phenothiazine-5-oxides, the aroyl-substituted phenothiazine-5-oxides, the carboxyl-substituted phenothiazine-5-oxides, the halogen-substituted phenothiazine-5-oxides, the N-(dialkylaminoalkyl)-substituted phenothiazine-5-oxides and the hydrochlorides of these compounds.

Particularly preferred phenothiazine compounds are selected from the group consisting of phenothiazine, 3-phenylphenothiazine, N-phenylphenothiazine, phenothiazine-5-oxide, N-benzoylphenothiazine, 7-benzoylphenothiazine, 3,7-difluorophenothiazine, N-ethylphenothiazine, 2-acetylphenothiazine, 3,7-dioctylphenothiazine, N-methylphenothiazine-5-oxide, N-acetylphenothiazine, N-(2-diethylaminoethyl)phenothiazine, N-(2-dimethylaminopropyl)phenothiazine, N-(2-dimethylaminopropylphenothiazine) hydrochloride, N-octadecylphenothiazine and N-propylphenothiazine.

The inhibitors used in accordance with the invention may also be monoalkyl ethers of hydroquinone. These are, in particular, hydroquinone monoethers with aliphatic alcohols having one to six carbon atoms. Particular preference is given to using the monomethyl ether of hydroquinone.

In addition to the phenothiazine compounds and/or hydroquinone monoalkyl ethers, the inhibitor solution to be added in accordance with the invention may also comprise other polymerization inhibitors. Examples of these include hydroquinone, diphenylamine, p-phenylenediamine, compounds comprising nitroxyl radicals, compounds comprising a nitroso group, and hydroxylamines. Examples of such inhibitors can be found in WO 99/21893 A2.

Solvents used in accordance with the invention are generally alkylene glycols themselves, polyalkylene glycols derived from alkylene glycols or the corresponding terminally etherified derivatives. These compounds are collectively referred to as (poly)alkylene glycol in this description.

Examples of alkylene glycols are ethylene glycol, propylene glycol, butylene glycol or hexamethylene glycol. Examples of polyalkylene glycols are polyethylene glycol, polypropylene glycol or polybutylene glycol or mixed derivatives thereof, such as polyethylene polypropylene glycols.

Examples of terminally etherified derivatives of (poly)alkylene glycols are compounds in which the terminal hydroxyl groups are completely or partially etherified with alkyl groups.

Solvents preferably used in accordance with the invention are compounds of the formula I

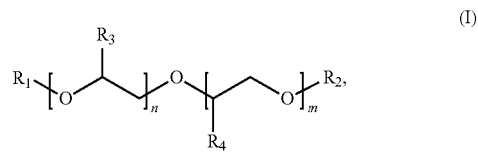

(I)

where n and m are mutually independently 0-10, wherein n+m is ≥1, $R_1$ and $R_2$ are mutually independently hydrogen or linear or branched $C_1$ to $C_6$ alkyl, wherein preferably at least one of the residues $R_1$ and $R_2$ is a linear or branched $C_1$ to $C_6$ alkyl, and $R_3$ and $R_4$ are mutually independently hydrogen or methyl.

Examples of glycol ethers of the general formula I preferably used in accordance with the invention are ethylene glycol butyl ether [111-76-2], ethylene glycol monomethyl ether [109-86-4], ethylene glycol monoethyl ether [110-80-5], ethylene glycol dimethyl ether [110-71-4], ethylene glycol diethyl ether [629-14-1], 1-methoxy-2-propanol [107-98-2], diethylene glycol monoethyl ether [111-90-0], diethylene glycol dimethyl ether [111-96-6] diethylene glycol diethyl ether [112-36-7], diethylene glycol monobutyl ether [112-34-5], diethylene glycol dibutyl ether [112-73-3], diethylene glycol monopropyl ether [6881-94-3], diethylene glycol monohexyl ether [112-59-4], dipropylene glycol monomethyl ether [34590-94-8], dipropylene glycol monobutyl ether [29911-28-2], dipropylene glycol mono-tert-butyl ether [132739-31-2], dipropylene glycol monopropyl ether [29911-27-1], triethylene glycol dimethyl ether [112-49-2], triethylene glycol monoethyl ether [112-50-5], tripropylene glycol monobutyl ether [55934-93-5], tripropylene glycol monomethyl ether [25498-49-1] and/or tripropylene glycol monopropyl ether [96077-04-2].

The glycol ethers may each serve as a solvent in pure form, or mixtures of glycol ethers can be used.

Preferred glycol ethers of the general formula (I) are diethylene glycol monoethyl ether, diethylene glycol monobutyl ether, diethylene glycol dibutyl ether, dipropylene glycol mono-tert-butyl ether, triethylene glycol monoethyl ether and/or tripropylene glycol monobutyl ether.

Particularly preferred glycol ethers of the general formula (I) are diethylene glycol monoethyl ether and diethylene glycol monobutyl ether. Diethylene glycol monoethyl ether is not subject to labeling and is water-miscible. Diethylene glycol monobutyl ether is likewise water-miscible and is only subject to labeling due to its eye irritant properties.

The advantageous nature of the method according to the invention is as follows:
  compared with the recommendation of Res. Discl. 1989, 300, 245 (Eng.), to add an aqueous Cu(II) salt solution for immediately terminating an unintentional free radical polymerization of acrylic acid, inhibitor solutions based on (poly)alkylene glycol are as a rule, on the one hand, miscible both with aqueous and non-aqueous systems and, on the other hand, also subsequently readily separable from such systems;
  Process Saf. Prog. (1993), 12(2), 111-4, recommends, for immediately terminating an unintentional free radical polymerization of acrylic acid, adding thereto an inhibitor solution based on phenothiazine, but this prior art contains no indication that the phenothioazine is to be added in solution in a solvent comprising mainly (poly)alkylene glycol.
  (poly)alkylene glycols do not have a weak basic character unlike the N-alkylpyrrolidones described in WO 99/21893 A2 and DE 199 18 970 A1. While a thermal effect occurs on addition of an inhibitor solution in N-alkylpyrrolidones to an acidic acrylic monomer (e.g. acrylic acid), this is not the case in inhibitor solutions in (poly)alkylene glycols (see FIG. 2; here, under adiabatic conditions, a 15% inhibitor solution in N-alkylpyrrolidone or in diethylene glycol monobutyl ether were added to charged 20% by weight acrylic acid and the thermal effect measured). This undesirable thermal effect, which could even accelerate an incipient polymerization, is probably a result of an acid-base reaction between acrylic acid and the N-alkylpyrrolidone. When using inhibitor solution according to the invention in (poly)alkylene glycol, such a thermal effect is not observed, which increases the safety of its application compared to the prior art.

Further advantages of the procedure according to the invention are that (poly)alkylene glycols are inert to most substances. Furthermore, the boiling point of many (poly)alkylene glycols is above the boiling point of many monomers, facilitating subsequent separation from the monomers and permitting further use of the monomers. In the case that the monomer is ethylhexyl acrylate (boiling point 215-219° C.), an inhibitor solution in accordance with the invention in diethylene glycol monohexyl ether (boiling point 258° C.) or diethylene glycol dibutyl ether (boiling point 252° C.) can be used to advantage, since after successful termination of a polymerization the monomer can be regenerated as a first fraction by distillation. When using an inhibitor solution according to the prior art in N-methylpyrrolidone (boiling point 204° C.), the regeneration of ethylhexyl acrylate is only possible if the N-methylpyrrolidone is distilled off beforehand.

Furthermore, the high boiling point of (poly)alkylene glycols prevents the formation of explosive vapor/oxygen mixtures, for example, in hot climates. (Poly)alkylene glycols also generally have a low melting point which enables their use even in cooler environments, for example, in Nordic countries. Also advantageous is the high flash point of (poly)alkylene glycols and their lack of toxicological concern.

Especially advantageous for the method according to the invention, however, is that phenothiazine and/or hydroquinone monoalkyl ethers have increased solubility in (poly) alkylene glycols at standard temperature (25° C.), which also does not decrease significantly on cooling to −20° C.

This enables the use according to the invention of solutions with an increased content of phenothiazine and/or monoalkyl ethers of hydroquinone, without the risk that a change in external temperature directly leads to partial or complete precipitation of the inhibitor from the solution.

Also advantageous is the low viscosity of the inhibitor solution that allows easy dispensing even at low temperatures.

Addition of inhibitors as such for immediately terminating free radical polymerizations is disadvantageous in that the low degree of division given of the inhibitor as such is not appropriate for the required immediate termination.

In addition to (poly)alkylene glycol, the inhibitor solution to be added according to the invention may also contain other solvents. Suitable solvents of this type are all those which are miscible with (poly)alkylene glycols. Examples of such solvents which may be mentioned are butyl acetate, methyl isobutyl ketone, toluene, xylene, chlorobenzene or o-dichlorobenzene.

The solvent of the inhibitor solution to be added according to the invention preferably comprises at least 75% by weight, particularly preferably at least 85% by weight and especially preferably at least 95% by weight of said solvent, of (poly)alkylene glycol. In accordance with the invention, the solvent of the inhibitor solution advantageously consists exclusively of (poly)alkylene glycol.

In general, the content of inhibitor in the inhibitor solutions to be added according to the invention is at least 5% by weight, preferably at least 15% by weight, based on the solution. With particular advantage, in addition to the phenothiazine compound and/or the hydroquinone monoalkyl ether, the inhibitor solution to be added according to the invention does not comprise any further polymerization inhibitor.

Advantageously, a solution of phenothiazine in (poly) alkylene glycol is preferred in accordance with the invention, of which the phenothiazine content is appropriately at least 5% by weight, preferably at least 15% by weight, based on the solution.

The method according to the invention is suitable for immediately terminating any type of free radical polymerizations, in particular those unintentional and/or runaway free radical polymerizations mentioned at the beginning of this document.

Among these are included above all the unintentional free radical polymerizations of those substances which comprise at least 95% by weight or at least 98% by weight or at least 99% by weight or 100% by weight of (meth)acrylic monomers. Suitable (meth)acrylic monomers in this case are especially (meth)acrylic acid and esters of (meth)acrylic acid and monohydric or polyhydric alkanols. This applies particularly to monohydric or polyhydric alkanols having one to twenty carbon atoms, or one to twelve carbon atoms or one to eight carbon atoms.

Representative examples of such esters are, e.g. methyl acrylate, ethyl acrylate, n-butyl acrylate, isobutyl acrylate, tert-butyl acrylate, 2-ethylhexyl acrylate, methyl methacrylate, ethyl methacrylate, n-butyl methacrylate and tert-butyl methacrylate.

In an advantageously technical applicable manner, the incorporation of the inhibitor solution to be added in accordance with the invention can be carried out via a spray nozzle, in order to achieve the most rapid homogeneous distribution in a free radical polymerizing system. Obviously, the aforementioned homogenization can also be supported by pumping and/or stirring. However, such mechanical assistance also entails the risk of accelerating polymerization since an energy input is simultaneously linked to the free radical polymerizing system. The inhibitor solution to be introduced is appropriately contained in a suitable reservoir.

If the method according to the invention for immediately terminating free radical polymerization is applied to unintentionally polymerizing (meth)acrylic monomers as such, the amount of inhibitor, preferably phenothiazine, added in total should be approximately 0.01 to 3% by weight, based on the (meth)acrylic monomers. Generally, an amount of inhibitor added of 0.01 to 0.05% by weight is sufficient, frequently 0.025% by weight.

The efficacy of the (poly)alkylene solutions can also be checked as described in the examples in WO 99/21893 A2.

The following examples and figures illustrate the invention without these being limiting.

Shown are:

FIG. 1 the solubility of phenothiazine in selected diethylene glycol ethers from the group of (poly)alkylene glycols.

Figure 2:
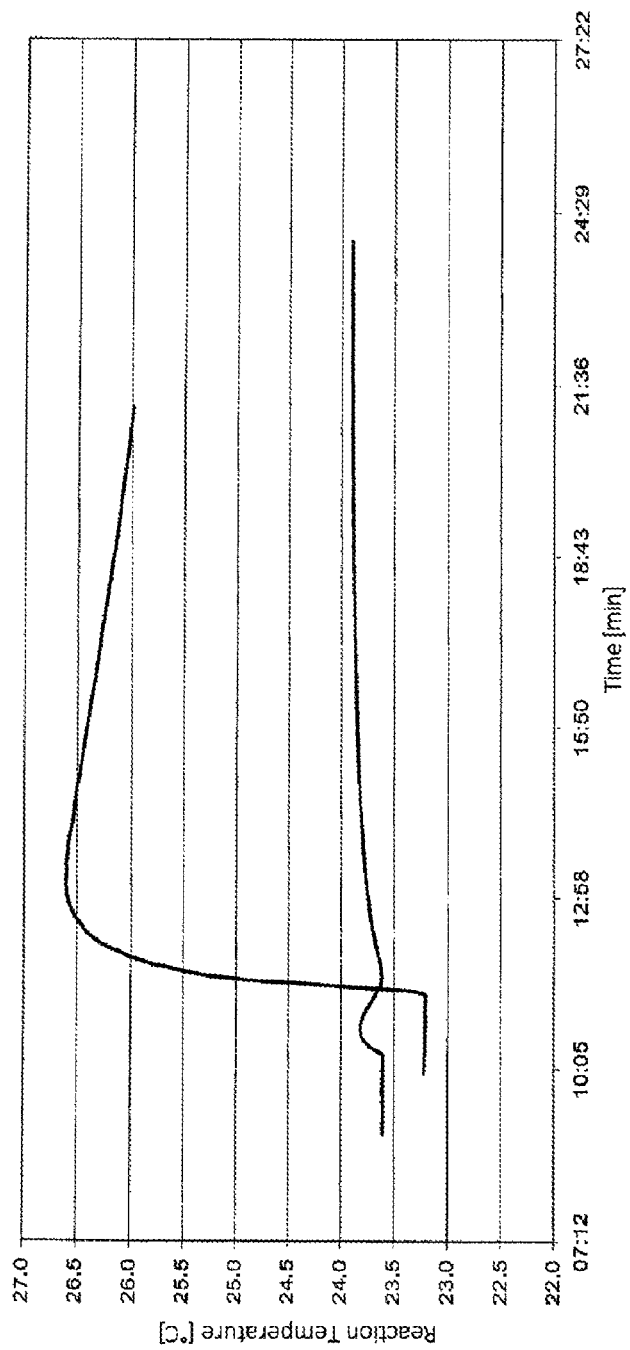
FIG. 2 is a diagram illustrating the temperature profile during adiabatic mixing of acrylic acid with 20% by weight of a 15% phenothiazine solution in N-methylpyrrolidone (prior art, top curve) or in diethylene glycol monobutyl ether (inventive, lower curve)

FIG. 2 the temperature profile during adiabatic mixing of acrylic acid with 20% by weight of a 15% phenothiazine solution in N-methylpyrrolidone (prior art, top curve) or in diethylene glycol monobutyl ether (inventive, lower curve).

Figure 3:
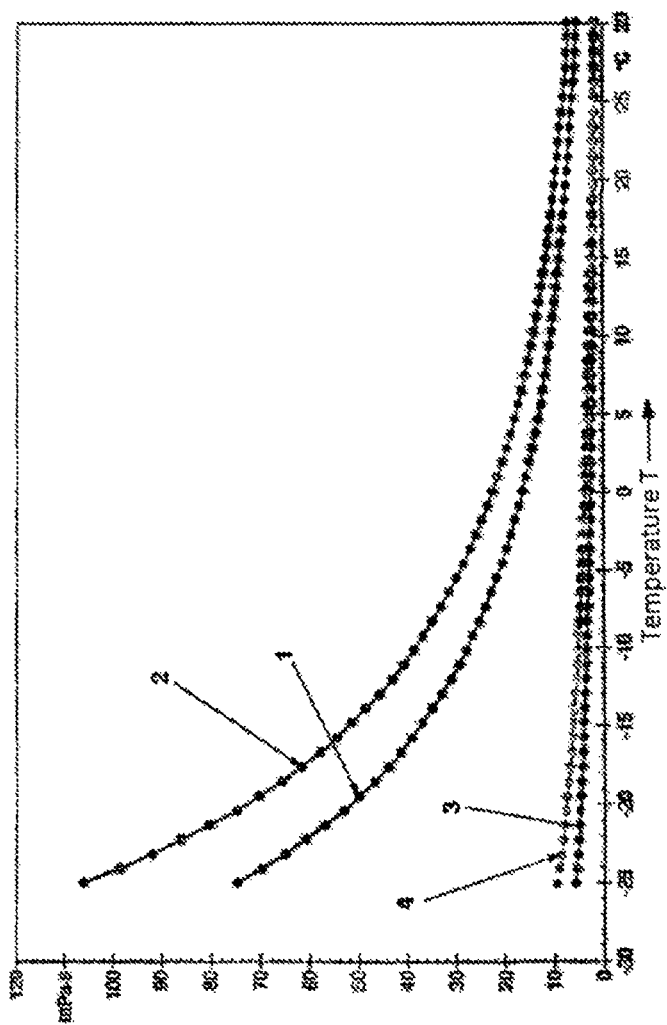
FIG. 3 is a graph illustrating the viscosity as a function of temperature of solutions of phenothiazine in (poly)alkylene glycols used in accordance with the invention.

FIG. 3 the viscosity as a function of temperature of solutions of phenothiazine in (poly)alkylene glycols used in accordance with the invention.

EXAMPLES 1 to 4

15 g of phenothiazine were dissolved in 85 g of glycol ether at room temperature or with slight warming. The viscosity of these solutions is represented in FIG. 3 as a function of temperature.
Example 1: Diethylene glycol monoethyl ether
Example 2: Diethylene glycol monobutyl ether
Example 3: Diethylene glycol dimethyl ether
Example 4: Diethylene glycol dibutyl ether The resulting solutions show no crystallization on cooling to −25° C., and the viscosity increased depending on the solvent up to a maximum of 106 mPas.

The viscosity was determined using a rheometer MCR 101 from Anton Paar (cone-plate system). The shear rate was 10 sec$^{-1}$.

FIG. 3 shows the viscosity in mPas of the four solutions according to Examples 1-4 as a function of temperature at temperatures between −25° C. and +30° C. The curve labeled 1 describes the temperature course of the viscosity of the solution of Example 1. The curves labeled 2, 3 and 4 describe the temperature course of the viscosity of the solutions according to Examples 2, 3 and 4.

Example 5 (mixing experiments of acrylic acid with an inventive inhibitor solution or with inhibitor solution according to the prior art):

50 g of acrylic acid were charged at room temperature in a 100 ml reactor (EASY-MAX from Mettler Toledo) equipped with magnetic stirrer and adjusted to the actual temperature of the inhibitor solution with stirring (~200 rpm) and then 10 g of 15% inhibitor solution were metered in below the surface into the reactor under adiabatic conditions over 4 seconds (~150 ml/min) using a metering unit and the mixture stirred for ca. 10 min. The course of the internal temperature using inhibitor solution according to the invention (in diethylene glycol monobutyl ether) compared with inhibitor solution according to the prior art (in N-methylpyrrolidone) is shown in FIG. 2. In the case of the inhibitor solution according to the prior art an exothermic reaction can be identified but not using the inhibitor solution according to the invention.

Comparable phenomena can be identified also when mixing inhibitor solutions with methacrylic acid or acrylonitrile.

The invention claimed is:

1. A method for immediately terminating free radical polymerizations by adding an inhibitor solution comprising a phenothiazine compound and/or a monoalkyl ether of hydroquinone to the free radical polymerizing system, characterized in that the inhibitor solution comprises a solvent, at least 50% by weight of which is one or more terminally etherified derivatives of alkylene glycol and/or of polyalkylene glycol, wherein the free radical polymerizing system comprises (meth)acrylic monomers.

2. The method as claimed in claim 1, characterized in that the phenothiazine compound is selected from the group consisting of phenothiazine, 3-phenylphenothiazine, N-phenylphenothiazine, phenothiazine-5-oxide, N-benzoylphenothiazine, 7-benzoylphenothiazine, 3,7-difluorophenothiazine, N-ethylphenothiazine, 2-acetylphenothiazine, 3,7-dioctylphenothiazine, N-methylphenothiazine-5-oxide, N-acetylphenothiazine, N-(2-diethylaminoethyl)phenothiazine, N-(2-dimethylaminopropyl)phenothiazine, N-(2-dimethylaminopropylphenothiazine) hydrochloride, N-octadecylphenothiazine and N-propylphenothiazine.

3. The method as claimed in claim 1, characterized in that the monoalkyl ether of hydroquinone is a hydroquinone monoether with aliphatic alcohols having one to six carbon atoms.

4. The method as claimed in claim 1, characterized in that the terminally etherified derivatives of alkylene glycol and/or polyalkylene glycol are compounds of the formula I

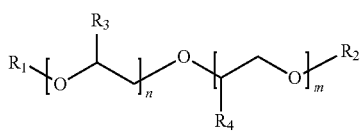

(I)

where n and m are mutually independently 0-10, wherein n+m is ≥1, $R_1$ and $R_2$ are mutually independently hydrogen or linear or branched $C_1$ to $C_6$ alkyl, wherein at least one of the residues $R_1$ and $R_2$ is a linear or branched $C_1$ to $C_6$ alkyl, and $R_3$ and $R_4$ are mutually independently hydrogen or methyl.

5. The method as claimed in claim 4, characterized in that the compounds of the formula I are selected from the group consisting of ethylene glycol butyl ether, ethylene glycol monomethyl ether, ethylene glycol monoethyl ether, ethylene glycol dimethyl ether, ethylene glycol diethyl ether, 1-methoxy-2-propanol, diethylene glycol monoethyl ether, diethylene glycol dimethyl ether, diethylene glycol diethyl ether, diethylene glycol monobutyl ether, diethylene glycol dibutyl ether, diethylene glycol monopropyl ether, diethylene glycol monohexyl ether, dipropylene glycol monomethyl ether, dipropylene glycol monobutyl ether, dipropylene glycol mono-tert-butyl ether, dipropylene glycol monopropyl ether, triethylene glycol dimethyl ether, triethylene glycol monoethyl ether, tripropylene glycol monobutyl ether, tripropylene glycol monomethyl ether and tripropylene glycol monopropyl ether.

6. The method as claimed in claim 5, characterized in that the compounds of the formula I are selected from the group consisting of diethylene glycol monoethyl ether, diethylene glycol monobutyl ether, diethylene glycol dibutyl ether, dipropylene glycol mono-tert-butyl ether, triethylene glycol monoethyl ether and tripropylene glycol monobutyl ether.

7. The method as claimed in claim 1, characterized in that the phenothiazine compound and/or monoalkyl ether of hydroquinone in the inhibitor solution is present in an amount of at least 5% by weight, based on the weight of the inhibitor solution.

8. The method as claimed in claim 1, characterized in that the (meth)acrylic monomer is (meth)acrylic acid and/or a (meth)acrylic ester.

9. The method as claimed in claim 1, wherein the inhibitor solution comprises at least 15% by weight, based on the solution, of the phenothiazine compound and/or the monoalkyl ether of hydroquinone, and at least 50% by weight of said solvent is at least one compound selected from the group consisting of diethylene glycol monoethyl ether, diethylene glycol monobutyl ether, diethylene glycol dibutyl ether, dipropylene glycol mono-tert-butyl ether, triethylene glycol monoethyl ether and tripropylene glycol monobutyl ether.

10. The method as claimed in claim 9, wherein the inhibitor solution is characterized in that, during the addition of the inhibitor solution with (meth)acrylic monomers in the free radical polymerizing system, no pronounced enthalpy of mixing occurs.

11. A method for immediately terminating free radical polymerizations comprising adding an inhibitor solution comprising a phenothiazine compound to a free radical polymerizing system undergoing polymerization, wherein the inhibitor solution comprises a solvent, of which at least 50% by weight of is a terminally etherified derivative of alkylene glycol and/or of polyalkylene glycol.

12. A method for immediately terminating free radical polymerizations by adding an inhibitor solution comprising a phenothiazine compound and/or a monoalkyl ether of hydroquinone to the free radical polymerizing system, characterized in that the inhibitor solution comprises a solvent, at least 50% by weight of which is one or more terminally etherified derivative of polyalkylene glycol selected from the group consisting of diethylene glycol monoethyl ether and diethylene glycol monobutyl ether.

13. The method as claimed in claim 12, wherein the inhibitor solution comprises phenothiazine and at least one solvent selected from the group consisting of diethylene glycol monoethyl ether and diethylene glycol monobutyl ether.

14. The method as claimed in claim 13, wherein the inhibitor solution is characterized in that during the mixing of the inhibitor solution with acrylic monomers no pronounced enthalpy of mixing occurs.

15. The method as claimed in claim 1, wherein at least 75% by weight of the solvent is one or more terminally etherified derivatives of alkylene glycol and/or of polyalkylene glycol.

16. The method as claimed in claim 1, wherein the inhibitor solution is incorporated into the free radical polymerizing system by way of a method selected from the group consisting of spray application, pumping, and stirring.

17. The method as claimed in claim 1, wherein the method further comprises regenerating the (meth)acrylic monomers from the terminated free radical polymerizing system.

18. The method as claimed in claim 3, wherein the monoalkyl ether of hydroquinone is a monomethyl ether of hydroquinone.

19. The method as claimed in claim 11, wherein the free radical polymerizing system comprises one or more (meth)acrylic monomers including (meth)acrylic acid and a derivative thereof selected from the group consisting of acrolein, methacrolein, acrylic acid, methacrylic acid, methyl acrylate, ethyl acrylate, n-butyl acrylate, isobutyl acrylate, tert-butyl acrylate, 2-ethylhexyl acrylate, methyl methacrylate, ethyl methacrylate, n-butyl methacrylate and tert-butyl methacrylate, and monohydric or polyhydric alkanols having one to twenty carbon atoms.

20. The method as claimed in claim 19, wherein no pronounced enthalpy of mixing occurs during addition of the inhibitor solution to the free radical polymerizing system.

21. The method as claimed in claim 19, wherein the inhibitor solution added provides the phenothiazine compound in an amount of 0.01 to 3% by weight, based on the (meth)acrylic monomers.

* * * * *